(12) United States Patent
Rodriguez Serrano et al.

(10) Patent No.: US 8,027,540 B2
(45) Date of Patent: Sep. 27, 2011

(54) ASYMMETRIC SCORE NORMALIZATION FOR HANDWRITTEN WORD SPOTTING SYSTEM

(75) Inventors: Jose A. Rodriguez Serrano, Barcelona (ES); Florent Perronnin, Domène (FR)

(73) Assignee: Xerox Corporation, Norwalk, CT (US)

( * ) Notice: Subject to any disclaimer, the term of this patent is extended or adjusted under 35 U.S.C. 154(b) by 926 days.

(21) Appl. No.: 12/014,193

(22) Filed: Jan. 15, 2008

(65) Prior Publication Data

US 2009/0180695 A1      Jul. 16, 2009

(51) Int. Cl.
*G06K 9/18*      (2006.01)
(52) U.S. Cl. ....................................... 382/186
(58) Field of Classification Search .............. 382/159, 382/186–190, 209, 218, 224, 226, 228–229; 704/251
See application file for complete search history.

(56) References Cited

U.S. PATENT DOCUMENTS

| | | | |
|---|---|---|---|
| 5,425,129 A | | 6/1995 | Garman et al. |
| 5,590,317 A | * | 12/1996 | Iguchi et al. ........................ 1/1 |
| 6,138,095 A | | 10/2000 | Gupta et al. |
| 2006/0294390 A1 | | 12/2006 | Navratil et al. |
| 2007/0154071 A1 | | 7/2007 | Lin et al. |

OTHER PUBLICATIONS

A. Brakensiek, J. Rottland and G. Rigoll, "Confidence measures for an address reading system," in Proceedings of the Seventh International Conference on Document Analysis and Recognition (ICDAR'03), pp. 294, 2003.
Martin, A., et al. The DET Curve in Assessment of Detection Task Performance, pp. 1895-1898, 1997.
A. Schlapbach and H. Bunke, "Off-line writer verification: A comparison of a hidden Markov model (HMM) and a Gaussian mixture model, (GMM)based system," pp. 1-6, 2006.
L. R. Rabiner, "A Tutorial on Hidden {M}arkov Models and Selected Applications in Speech Recognition," Proceedings of the IEEE, vol. 77, pp. 257-286, 1989.
S. Young, "Detecting misrecognitions and out-of-vocabulary words", ICASSP 94, vol. 2, pp. 21-24, 1994.

* cited by examiner

*Primary Examiner* — Daniel Mariam
(74) *Attorney, Agent, or Firm* — Gibb I.P. Law Firm, LLC

(57) ABSTRACT

A method begins by receiving an image of a handwritten item. The method performs a word segmentation process on the image to produce a sub-image and extracts a set of feature vectors from the sub-image. Then, the method performs an asymmetric approach that computes a first log-likelihood score of the feature vectors using a word model having a first structure (such as one comprising a Hidden Markov Model (HMM)) and also computes a second log-likelihood score of the feature vectors using a background model having a second structure (such as one comprising a Gaussian Mixture Model (GMM)). The method computes a final score for the sub-image by subtracting the second log-likelihood score from the first log-likelihood score. The final score is then compared against a predetermined standard to produce a word identification result and the word identification result is output.

22 Claims, 2 Drawing Sheets

ASYMMETRIC SCORE NORMALIZATION FOR HANDWRITTEN WORD SPOTTING SYSTEM

BACKGROUND AND SUMMARY

Embodiments herein generally relate to an approach to score normalization for Hidden Markov Model (HMM) and other similar handwritten word-spotting systems.

Score normalization techniques are known to significantly improve the performance of HMM-based systems on different problems such as handwriting recognition or speech recognition. Embodiments herein produce a very significant increase of the performance for continuous HMMs and a dramatic improvement for semi-continuous HMMs (SC-HMMs).

Word spotting is important to many organization that offer services, such as handling customer correspondence and corresponding processes for clients. For example, an organization may receive customers' letters. In their letters, customers can ask for different services and actions, e.g. resign a contract, take over another customer's contract, etc. Spotting characteristic words within a customer letter can allow automatic dispatching of the letter to an appropriate department or the production of an automated response, including (e.g. natural language processing (NLP) techniques) to completely automate letter processing. This allows immediate processing of correspondence deemed urgent. For example, in the case of Customer Relationship Management, the earlier an unhappy customer is contacted, the higher the chances of getting this customer back.

Other requests for services related to word spotting, can include a government official wanting to spot specific topics in their incoming correspondence (e.g., politically important topics, such as global warming). In another case, the government agency may want to detect letters that require a very quick response to match various Service Level Agreement requirements. Also, banks want to be able to detect the special terms or acceptances on contracts.

In the domain of Business Process Outsourcing and more particularly Imaging, one of the most common, if not ubiquitous, tasks is the categorization of documents. Many of these documents are received in paper form, either because of their "legal" significance, as a backlog of old documents to be archived, or as general-purpose correspondence; and they need to be classified. Various techniques exist for classifying, whether based on the aspect of documents, on the textual content, or based on templates. All these techniques have their specific advantages and drawbacks.

In practice however, the categorization task is very often performed by human operators quickly scanning the document for a few specific words (e.g. "Housing Benefits", "Deed of Trust", etc.) rather than reading the whole document. More complex classification techniques could be applied (e.g. based on optical character recognition (OCR) for typed documents) but constitute an inefficient use of resources when compared to the more efficient word spotting.

In view of the foregoing, the present embodiments provide a method that begins by receiving an image of a handwritten item. The method performs a word segmentation process on the image to produce a set of sub-images and extracts a set of feature vectors from each sub-image. Then, the method performs an asymmetric approach that computes a first log-likelihood score of the feature vectors using a word model having a first structure (such as one comprising a Hidden Markov Model (HMM)) and also computes a second log-likelihood score of the feature vectors using a background model having a second structure (such as one comprising a Gaussian Mixture Model (GMM)). The method computes a final score for the sub-image by subtracting the second log-likelihood score from the first log-likelihood score. The final score is then compared against a predetermined standard to produce a word identification result and the word identification result is output.

As mentioned above, the first and second structures are different. For example, the first structure can comprise a different number of states than the second structure or can be based on different models. Further, the computing of the first log-likelihood and the second log-likelihood scores have relatively lower computational costs when the second structure is simpler than the first structure, and relatively higher computational costs when second structure is the same as the first structure. Therefore, thanks to the potentially simpler structure of the asymmetric approach, the embodiments herein have a significantly lower computational cost at both training and test time.

The computing of the first log-likelihood score and the computing of the second log-likelihood score can comprise continuous HMM or semi-continuous HMM. The continuous HMM uses different sets of Gaussian functions for the word model and the background model, and the semi-continuous HMM uses the same set of Gaussian functions for the word model and the background model.

A system embodiment herein comprises an input/output device adapted to receive the image of the handwritten item. A word segmenter is operatively connected to the input/output device. The word segmenter is adapted to segment the image so as to produce the sub-image. An extractor is operatively connected to the word segmenter, and the extractor is adapted to extract the set of feature vectors from the sub-image.

A processor is operatively connected to the other elements. The processor is adapted to compute the first log-likelihood score of the feature vectors using the word model having the first structure (e.g., comprising a Hidden Markov Model (HMM)) and compute the second log-likelihood score of the feature vectors using the background model having the second structure (e.g., comprising a Gaussian Mixture Model (GMM)). The processor is further adapted to compute the final score for the sub-image by subtracting the second log-likelihood score from the first log-likelihood score.

A comparator is operatively connected to the processor. The comparator is adapted to compare the final score against the predetermined standard to produce the word identification result. The input/output device is further operatively connected to the comparator and is adapted to output the word identification result.

During the computing of the first log-likelihood score and the computing of the second log-likelihood score, the processor is further adapted to employ either continuous HMM or semi-continuous HMM, as described above. These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
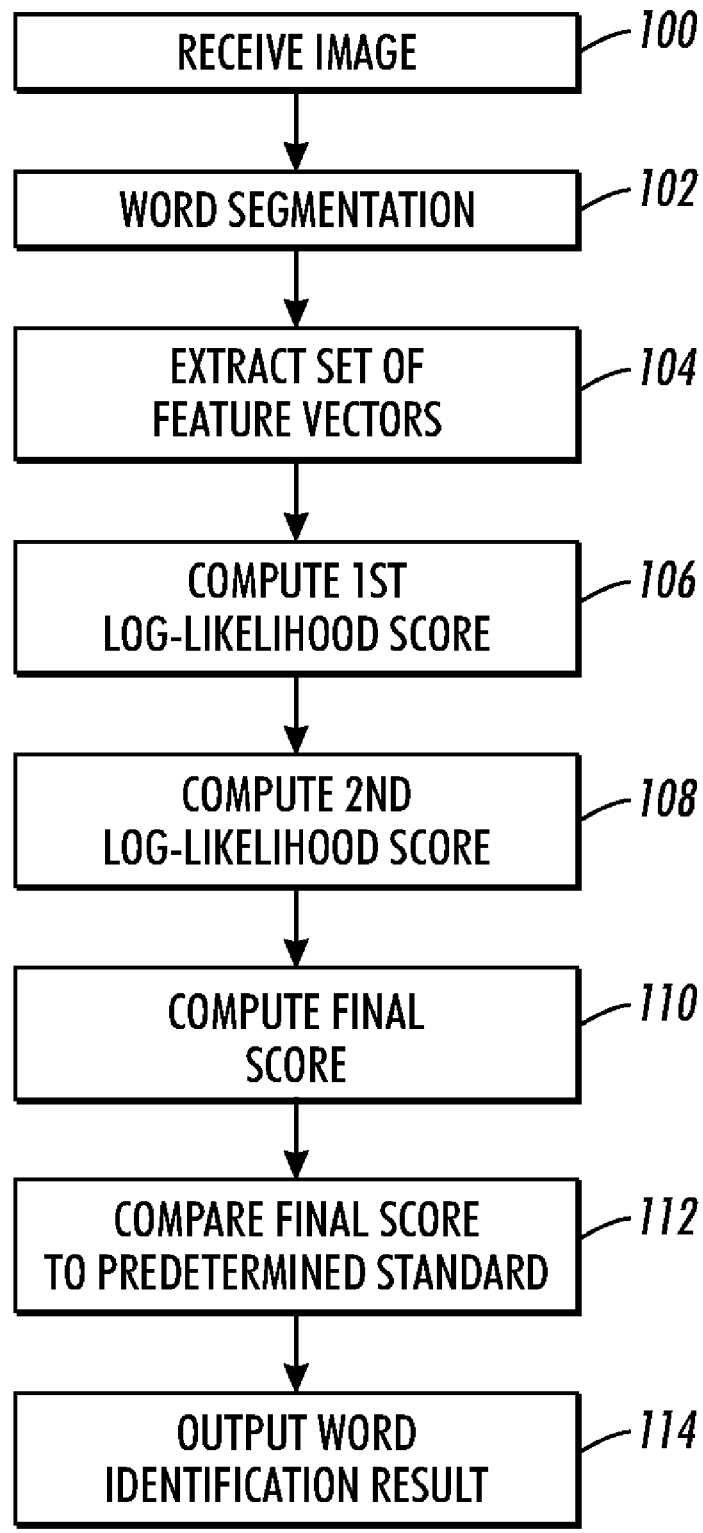
FIG. 1 is a flow diagram illustrating embodiments herein.

As discussed above, embodiments herein relate to score normalization for hidden Markov model (HMM) and other similar handwritten word-spotting systems.

One approach to handwritten word spotting is to describe a word image using a sequence of feature vectors X and then to classify these features using HMMs (details about HMMs can be found in L. R. Rabiner, "A Tutorial on Hidden {M}arkov Models and Selected Applications in Speech Recognition," Proceedings of the IEEE, vol. 77, pp. 257-286, 1989. Also, see U.S. Patent Publications 2007/0154071 and 2006/0294390 (the complete disclosures of which are incorporated herein by reference) for discussions of such models.

One may want to spot one of the N words $\{w_1, \ldots, w_N\}$. If one assumes that they are in a closed-world (i.e. all the images that one can encounter necessarily belong to one of these N words), then word-spotting is a simple N-class classification problem. In this case, it suffices to compute the likelihood values $p(X|w_n)$ and to choose the word with the highest log-likelihood.

However, the closed-world assumption is rarely a realistic one. For the problems people are targeting, they are only interested in detecting from one word to a few tens of words within a possible set of several hundreds or thousands of words. Hence, for each word, there is a two-class classification problem: does the considered image contain word $w_n$ or not? An image is considered to contain word $w_n$ if its score is above a threshold $\theta_n$. The score which is computed should therefore be robust enough to have the same threshold $\theta_n$ across different samples X.

For generative models, the likelihood $p(X|w_n)$ is not a robust score and the posterior probability $p(w_n|X)$ should be preferred as it takes into account competing hypotheses. Likelihood and posterior are related by Bayes' rule:

$$p(w_n | X) = \frac{p(X | w_n)p(w_n)}{p(X)}$$

In the following, the word priors $p(w_n)$ are not considered as their influence may be included in the thresholds $\theta_n$. Therefore, for use herein, the "score" for each word $w_n$ turns into:

$$\frac{p(X | w_n)}{p(X)}$$

The model which is used to compute the denominator above is generally referred to as garbage model or background model. Usually, the structure of the models in the numerator and denominator above are always the same (both the word model and the background model use the same structure) and therefore, such approaches to score normalization are referred to herein as symmetric approaches. Therefore, in one example of models with matching structures, if the word (numerator) model is an HMM with, say 50 states, then the model for the background (denominator) is an HMM with 50 states. The term HMM is used as a shorthand term herein for all similar learning algorithms, for example neural networks or Hidden Markov Models (HMM) that are methods used for pattern recognition. The embodiments herein are not limited to Hidden Markov Models but are applicable to all similar processes and algorithms, and such models are only used herein as examples. When the background model is an HMM, it is generally referred to as a filler model.

The present embodiments provide improvements by using an asymmetric approach to score normalization. The asymmetric approach of embodiments herein uses a background model with a different structure from the word model. In one example, some embodiments here use a Gaussian Mixture Model (GMM) as a background model, but use a HMM as the word model. Despite the fact that a GMM considers each sample independently, the embodiments herein produce results on par in terms of detection accuracy with respect to filler model (symmetric) based normalization. However, thanks to the simpler structure of the asymmetric approach, the embodiments herein have a significantly lower computational cost at both training and test time.

In the following, cases where the model (HMM) is continuous (C) and semi-continuous (SC) are distinguished. For continuous models (C-HMM) the word detection systems herein use one model (HMM) per word, plus a different model (GMM) for the background model. The steps of the training process are as follows. First, the HMM for a given word is trained on the samples of this word. Denote by $\lambda_n^{hmm}$ the parameters of the HMM for word $w_n$. Secondly, the background GMM is trained on all samples of the training set (or a random subset of samples) regardless of their word class. Let the parameters of the background GMM be denoted by $\lambda^{gmm}$. At testing time, the score of the samples X with respect to word $w_n$ is:

$$\log P(X|\lambda_n^{hmm}) - \log P(X|\lambda^{gmm})$$

In a semi-continuous SC-HMM, the emission probability of each state is modeled as a mixture of K shared Gaussians densities $\{p_1, \ldots, p_K\}$. This means that the only word-specific parameters in the emission probabilities are the mixture weights. Let $P_{n,s}$ be the emission probability in state s of word $W_n$. It can be written as:

$$p_{n,s}(x) = \sum_{k=1}^{K} w_{n,s,k} p_k(x)$$

Usually, the pool of Gaussians (Gaussian functions) must be large enough to achieve sufficient precision. The accuracy of SC-HMMs compared to C-HMMs is generally lower (how much lower depends on the application, the number of Gaussians in the shared pool, the type of features used etc.) but they are theoretically attractive due to their significantly reduced computational cost when many words need to be spotted (e.g. a few tens).

The idea of score normalization for SC-HMMs is the same as the one used in the case of continuous HMMs. The difference is that the same set of Gaussians is used 1) as a pool of Gaussians for the HMM and 2) as background model. The steps of the training process are as follows. First, the background GMM parameters $\lambda^{gmm}$ are trained on all samples of the training set (or on a random subset of samples) regardless of their word class. Then, the SC-HMM is initialized from the GMM and the $\lambda_n^{hmm}$ are trained using only samples of word $w_n$. The testing procedure is identical to the continuous HMM case. This normalization method does not induce any extra cost at training time and a very modest extra cost at test time.

The reasons why a GMM background model works very well in practice is because it models both the distribution of word image patterns and of writing styles. Thus, if the word $w_n$ contains very frequent patterns (e.g. if it contains frequent letters), then many word images are likely to score high on the HMM of $w_n$. However, as the GMM models the distributions of patterns found in any word image, then a word image containing frequent patterns will also score high on the GMM background model. Due to the subtraction of the log-likelihoods, the influence of frequent patterns will be reduced. In practice, no word image normalization method and no feature extraction method can perfectly compensate for the writing style. Thus, the GMM background model will certainly contain information about the writing styles encountered during the training phase. If a person has a very special/poor writing style which has not been encountered before, then it is likely that the word images of this person will score low on the HMMs. However, they will also score low on the GMM background model.

In the case of the SC-HMM, it is beneficial to use the same set of Gaussians for the word HMMs and the background GMM. Indeed, when a mismatch affects the HMM, its influence will be most reduced when the mismatch has the same influence on the GMM.

Given a word to detect, each of the testing samples can belong to a positive or to a negative class. It is positive if it has the same identity as the word to detect, and it is negative otherwise. The HMM associates a score to each image depending on how likely it is to be the searched word. In such a situation, a threshold must be set to make a decision. Errors can be then classified in terms of false rejection FR (positive samples with a score below the threshold) and false acceptance FA (negative samples with scores above the threshold). A way of characterizing the performance of a system is to plot FR versus FA. There is a tradeoff between FR and FA. In the present embodiments, it is more important to avoid false negatives than to miss correct words, so that one will fix a reasonable FR rate and evaluate the performance in terms of the lowest FA rates.

Regarding the performance of the embodiments herein, with respect to score normalization performance for continuous HMMs, the performance of the system can be evaluated 1) without score normalization, 2) with a filler model based score normalization, and 3) with the proposed GMM-based score normalization. For the system without score normalization, good results are obtained, for example, when using a single Gaussian per mixture. For the system which makes use of a filler model-based score normalization, good results are obtained, for example, when both the word HMMs and the filler model HMMs have 8 Gaussians per mixture. For the present embodiments, good performance is obtained, for example, when the word HMMs have 8 Gaussians per mixture and the GMM has 64 Gaussians. One ordinarily skilled in the art would understand that the foregoing numbers of Gaussian functions are only examples to show the relative differences between the different options and that the embodiments herein are not limited to a specific number of functions. Instead, embodiments herein will operate well with all numbers and types of functions The score normalization using a GMM is significantly better than without score normalization and is comparable to the use of a filler model. However, there is a benefit in using GMM over filler models in terms of computational cost. On the average, scoring a sub-image on an HMM filler model with 8 Gaussians per state takes approximately 20 ms, five times more than the same sub-image on the background GMM with 64 Gaussians (approximately 4 ms per sub-image). Further, these results are obtained considering the best possible case for the HMM filler model, in which there is a common model for all words. However, if a sub-image needs to be scored against word models with different numbers of states, their associated filler models will be different and multiple filler scores will have to be computed, which would even increase the computational expense. On the contrary, for the embodiments herein, the background GMM is the same for all words and, therefore, the computational cost does not increase as it would with the symmetric filler model.

The present embodiments show that GMM background normalization could help in the case of confusable words, i.e. words which contain frequent patterns. A word which contains frequent letters will contain frequent patterns. Therefore, one could define the confusability of a word as the average frequency of its constituting letters in the considered language. With embodiments herein, words which enjoy the largest increase in terms of accuracy due to the normalization are also the most confusable words.

Regarding the performance of the embodiments herein, with respect to score normalization performance for SC-HMMs, good results were obtained with a pool of, for example, 512 Gaussians. As explained above, the embodiments herein are not limited to a specific number of functions, instead embodiments herein will operate well with all numbers and types of functions. A conventional SC-HMM without score normalization may perform very poorly for a particular problem (which may be due to the high variability of the data or other reasons). However, when applying the score normalization based on the same pool of Gaussians underlying the SC-HMM, the performance dramatically increases with embodiments herein. Thus, good results are obtained herein when the same pool is used for training both the SC-HMM and the GMM.

The above processing is shown in generalized flowchart form in FIG. 1. As shown in FIG. 1, the present embodiments provide a method that begins by receiving an image of a handwritten item (100). The method performs a word segmentation process (102) on the image to produce a sub-image and extracts a set of feature vectors from the sub-image (104). Then, the method performs an asymmetric approach that computes (106) a first log-likelihood score of the feature vectors using a word model having a first structure (such as one comprising a Hidden Markov Model (HMM)) and also computes (108) a second log-likelihood score of the feature vectors using a background model having a second structure (such as one comprising a Gaussian Mixture Model (GMM)). The method computes a final score for the sub-image by subtracting the second log-likelihood score from the first log-likelihood score (110). The final score is then compared against a predetermined standard to produce a word identification result (112) and the word identification result is output (114).

As mentioned above, the first and second structures are different. For example, the first structure can comprise a different number of states than the second structure or can be based on different models. Further, the computing of the first log-likelihood and the second log-likelihood scores have relatively lower computational costs when the second structure is simpler than the first structure, and relatively higher computational costs when second structure is the same as the first structure. Therefore, thanks to the potentially simpler structure of the asymmetric approach, the embodiments herein have a significantly lower computational cost at both training and test time. A GMM cab be understood as an HMM with a single state.

The computing of the first log-likelihood score (106) and the computing of the second log-likelihood score (108) comprise either continuous training or semi-continuous training. The continuous training uses different sets of Gaussian functions for the word model and the background model, and the semi-continuous training uses the same set of Gaussian functions for training the word model and the background model.

Figure 2:
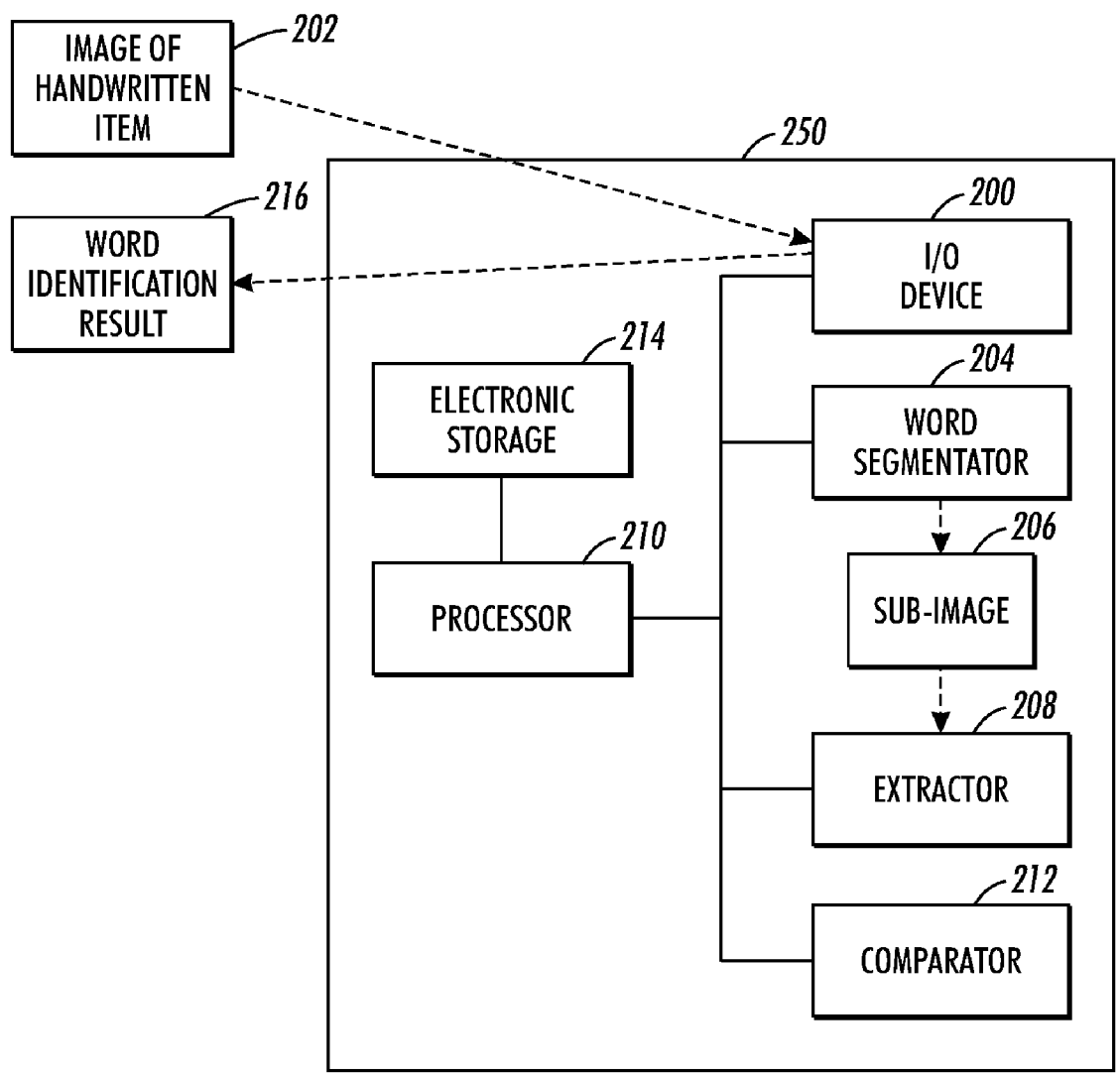
FIG. 2 is a schematic diagram illustrating embodiments herein.

A system 250 embodiment is shown in FIG. 2. An input/output device 200 is adapted to receive the image of the handwritten item 202. A word segmenter 204 is operatively connected to all devices including the input/output device 200. The word segmenter 204 is adapted to segment the image so as to produce the sub-image 206. An extractor 208 is operatively connected to all devices including the word segmenter 204, and the extractor 208 is adapted to extract the set of feature vectors from the sub-image 206.

A processor 210 is operatively connected to the other elements. The processor 210 can include or be connected to an electronic storage media 214 capable of tangibly storing instructions (potentially in the form of a computer program) that can be executed by the processor 210 to cause the processor to produce a tangible, concrete result and output such a result by transmitting, printing, or displaying the result.

The processor 210 is adapted to compute the first log-likelihood score of the feature vectors using the word model having the first structure (e.g., comprising a Hidden Markov Model (HMM)) and compute the second log-likelihood score of the feature vectors using the background model having the second structure (e.g., comprising a Gaussian Mixture Model (GMM)). The processor 210 is further adapted to compute the final score for the sub-image by subtracting the second log-likelihood score from the first log-likelihood score.

A comparator 212 is operatively connected to all devices including the processor 210. The comparator 212 is adapted to compare the final score against the predetermined standard to produce the word identification result. The input/output device 200 is further operatively connected to the comparator and is adapted to output the word identification result 216. During the computing of the first log-likelihood score and the computing of the second log-likelihood score the processor 210 is further adapted to perform either continuous training or semi-continuous training, as described above.

Many computerized devices are discussed above. Computerized devices that include chip-based central processing units (CPU's), input/output devices (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

All foregoing embodiments are specifically applicable to electrostatographic and/or xerographic machines and/or processes as well as to software programs stored on the electronic memory (computer usable data carrier) 214 and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
    receiving, by a computer, an image of a handwritten item;
    performing, by said computer, a word segmentation process on said image to produce a set of sub-images;
    extracting, by said computer, a set of feature vectors from each sub-image using said computer;
    computing, by said computer, a first log-likelihood score of said feature vectors using a word model having a first structure;
    computing, by said computer, a second log-likelihood score of said feature vectors using a background model having a second structure different than said first structure using said computer;
    computing, by said computer, a final score for said sub-image by subtracting said second log-likelihood score from said first log-likelihood score;
    comparing, by said computer, said final score against a predetermined standard to produce a word identification result; and
    outputting, by said computer, said word identification result.

2. The method according to claim 1, said word model comprising a Hidden Markov Model (HMM) and said background model comprising a Gaussian Mixture Model (GMM).

3. The method according to claim 2, said first structure comprising a different number of states than said second structure.

4. The method according to claim 2, said computing of said first log-likelihood score and said computing of said second log-likelihood score comprising one of continuous training and semi-continuous training.

5. The method according to claim 4,
    said continuous training using different sets of Gaussian functions for said word model and said background model, and
    said semi-continuous training using the same set of Gaussian functions for said word model and said background model.

6. The method according to claim 2, said computing of said first log-likelihood score and said computing of said second log-likelihood score having relatively lower computational costs, when said second structure is simpler than said first structure, and relatively higher computational costs, when said second structure is the same as said first structure.

7. A method comprising:
    receiving, by a computer, an image of a handwritten item;
    performing, by said computer, a word segmentation process on said image to produce a sub-image;
    extracting, by said computer, a set of feature vectors from said sub-image;
    computing, by said computer, a first log-likelihood score of said feature vectors using a word model having a first structure comprising a Hidden Markov Model (HMM);
    computing, by said computer, a second log-likelihood score of said feature vectors using a background model having a second structure comprising a Gaussian Mixture Model (GMM);
    computing, by said computer, a final score for said sub-image by subtracting said second log-likelihood score from said first log-likelihood score;
    comparing, by said computer, said final score against a predetermined standard to produce a word identification result; and
    outputting, by said computer, said word identification result.

8. The method according to claim 7, said first structure comprising a different number of states than said second structure.

9. The method according to claim 7, said computing of said first log-likelihood score and said computing of said second log-likelihood score comprising one of continuous training and semi-continuous training.

10. The method according to claim 9,
said continuous training using different sets of Gaussian functions for said word model and said background model, and
said semi-continuous training using the same set of Gaussian functions for said word model and said background model.

11. The method according to claim 7, said computing of said first log-likelihood score and said computing of said second log-likelihood score having relatively lower computational costs, when said second structure is simpler than first structure, and relatively higher computational costs, when said second structure is the same as said first structure.

12. A system comprising:
an input/output device receiving an image of a handwritten item;
a word segmenter operatively connected to said input/output device, said word segmenter segmenting said image to produce a sub-image;
an extractor operatively connected to said word segmenter, said extractor extracting a set of feature vectors from said sub-image;
a processor operatively connected to said extractor, said processor performing the following:
computing a first log-likelihood score of said feature vectors using a word model having a first structure;
computing a second log-likelihood score of said feature vectors using a background model having a second structure different than said first structure; and
computing a final score for said sub-image by subtracting said second log-likelihood score from said first log-likelihood score; and
a comparator operatively connected to said processor, said comparator comparing said final score against a predetermined standard to produce a word identification result,
said input/output device further being operatively connected to said comparator, said input/output device outputting said word identification result.

13. The system according to claim 12, said word model comprising a Hidden Markov Model (HMM) and said background model comprising a Gaussian Mixture Model (GMM).

14. The system according to claim 13, said first structure comprising a different number of states than said second structure.

15. The system according to claim 13, said processor further performing, during said computing of said first log-likelihood score and said computing of said second log-likelihood score, one of continuous training and semi-continuous training.

16. The system according to claim 15,
said continuous training using different sets of Gaussian functions for said word model and said background model, and
said semi-continuous training using the same set of Gaussian functions for said word model and said background model.

17. The system according to claim 13, said processor having, during said computing of said first log-likelihood score and said computing of said second log-likelihood score, relatively lower computational costs, when said second structure is simpler than said first structure, and relatively higher computational costs, when said second structure is the same as said first structure.

18. A system comprising:
an input/output device receiving an image of a handwritten item;
a word segmenter operatively connected to said input/output device, said word segmenter segmenting said image to produce a sub-image;
an extractor operatively connected to said word segmenter, said extractor extracting a set of feature vectors from said sub-image;
a processor operatively connected to said extractor, said processor performing the following:
computing a first log-likelihood score of said feature vectors using a word model having a first structure comprising a Hidden Markov Model (HMM);
computing a second log-likelihood score of said feature vectors using a background model having a second structure comprising a Gaussian Mixture Model (GMM); and
computing a final score for said sub-image by subtracting said second log-likelihood score from said first log-likelihood score; and
a comparator operatively connected to said processor, said comparator comparing said final score against a predetermined standard to produce a word identification result,
said input/output device further being operatively connected to said comparator, said input/output device outputting said word identification result.

19. The system according to claim 18, said first structure comprising a different number of states than said second structure.

20. The system according to claim 18, said processor further performing, during said computing of said first log-likelihood score and said computing of said second log-likelihood score, one of continuous training and semi-continuous training.

21. The system according to claim 20,
said continuous training using different sets of Gaussian functions for said word model and said background model, and
said semi-continuous training using the same set of Gaussian functions for said word model and said background model.

22. The system according to claim 18, said processor having, during said computing of said first log-likelihood score and said computing of said second log-likelihood score during said computing of said first log-likelihood score and said computing of said second log-likelihood score, relatively lower computational costs, when said second structure is simpler than said first structure, and relatively higher computational costs, when said second structure is the same as said first structure.

* * * * *